(12) United States Patent
Burris et al.

(10) Patent No.: US 11,107,114 B2
(45) Date of Patent: Aug. 31, 2021

(54) MONITORING OF A PROJECT BY VIDEO ANALYSIS

(71) Applicant: NCR Corporation, Atlanta, GA (US)

(72) Inventors: Matthew Robert Burris, Atlanta, GA (US); Jodessiah Sumpter, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/525,122

(22) Filed: Jul. 29, 2019

(65) Prior Publication Data

US 2021/0035150 A1 Feb. 4, 2021

(51) Int. Cl.
| | |
|---|---|
| *H04N 7/18* | (2006.01) |
| *G06Q 30/02* | (2012.01) |
| *G06K 9/00* | (2006.01) |
| *H04N 5/232* | (2006.01) |
| *G06T 7/20* | (2017.01) |
| *G10L 15/22* | (2006.01) |
| *G10L 25/63* | (2013.01) |
| *G05D 1/00* | (2006.01) |

(52) U.S. Cl.
CPC ....... *G06Q 30/0242* (2013.01); *G05D 1/0088* (2013.01); *G06K 9/00335* (2013.01); *G06K 9/00718* (2013.01); *G06T 7/20* (2013.01); *G10L 15/22* (2013.01); *G10L 25/63* (2013.01); *H04N 5/23203* (2013.01); *H04N 5/23299* (2018.08); *G06T 2207/10016* (2013.01); *G06T 2207/30196* (2013.01)

(58) Field of Classification Search
CPC ................................................ G06Q 30/0242
USPC ......................................................... 348/143
See application file for complete search history.

(56) References Cited

U.S. PATENT DOCUMENTS

| | | | | |
|---|---|---|---|---|
| 6,529,940 B1* | 3/2003 | Humble | ................. | G06Q 30/02 |
| | | | | 709/204 |
| 7,930,204 B1* | 4/2011 | Sharma | .............. | G06Q 30/0203 |
| | | | | 705/7.32 |
| 9,158,975 B2* | 10/2015 | Lipton | ............... | G06K 9/00771 |
| 10,296,936 B1* | 5/2019 | Saurabh | ............. | G06Q 30/0246 |
| 10,339,595 B2* | 7/2019 | Glaser | ................. | G06Q 20/203 |
| 10,628,660 B2* | 4/2020 | Adato | ............... | G06K 9/00671 |
| 2006/0020507 A1* | 1/2006 | Sagey | ............... | G06Q 30/0236 |
| | | | | 705/14.36 |
| 2008/0059297 A1* | 3/2008 | Vallier | ................... | G06Q 30/02 |
| | | | | 705/14.27 |
| 2009/0030780 A1* | 1/2009 | York | ..................... | G06Q 30/02 |
| | | | | 705/14.41 |

(Continued)

*Primary Examiner* — Leron Beck
(74) *Attorney, Agent, or Firm* — Schwegman, Lundberg & Woessner

(57) ABSTRACT

A monitoring project is defined interactively through an interface. Resources needed for the project are obtained, configured, arranged, and verified within a target area. Video and audio feeds are captured and analyzed during a project period within the target area and customer interactions and intentions are derived from detected customer behaviors within the feeds. The intentions and behaviors are indexed with aggregated metrics within a data store. The interface provides custom queries, reports, interactive graphics, and real-time notifications from the data store that depict the custom aggregated metrics for the intentions and behaviors of the monitoring project.

18 Claims, 5 Drawing Sheets

(56) References Cited

U.S. PATENT DOCUMENTS

| | | | | |
|---|---|---|---|---|
| 2009/0231135 A1* | 9/2009 | Chaves | ............... | G06Q 10/087 340/572.1 |
| 2011/0043663 A1* | 2/2011 | Tsuchiya | ............... | H04N 5/232 348/240.3 |
| 2015/0381946 A1* | 12/2015 | Renkis | ................. | G06T 19/003 348/47 |
| 2016/0379225 A1* | 12/2016 | Rider | ................ | G06K 9/00248 382/116 |
| 2017/0124603 A1* | 5/2017 | Olson | ..................... | H04W 4/02 |
| 2019/0025849 A1* | 1/2019 | Dean | ...................... | G03B 37/02 |
| 2019/0205933 A1* | 7/2019 | Glaser | ............... | G06K 9/00624 |
| 2019/0282307 A1* | 9/2019 | Azizian | ................ | A61B 34/20 |

* cited by examiner

MONITORING OF A PROJECT BY VIDEO ANALYSIS

BACKGROUND

Every year businesses invests enormous amounts of capital (money, equipment, and salaries) in attempting to reach new customers and retain their existing customers. A significant portion of this capital is expended on product distributors and retailers, who manufactures rely heavily on for delivering products and setting the environment where the customers will buy the products.

Estimates suggest that 40% of marketing materials are never set up and/or delivered to the customers; rather, these unused marketing materials are retained by the distributors or the retailers (stores) without being passed on to the consumers. In fact, the estimates may be low because there is no mechanism by which a manufacturer can track delivery of the materials. Random spot checks and surveys are typically used by manufacturers to verify that marketing materials, displays, and other materials are being deployed properly.

Consumer response data to new product launches and promotions encounter the same problem, where surveys and observations are conducted to attempt to build a statistically relevant understanding, which will always suffer from significant limitations due to the large number of demographic segments of the market, which all may respond quite differently.

In fact, there exists no current technology by which tracking, verification, and effectiveness of in-store marketing is measured. But, because of the believed necessity in building and maintaining brand loyalty or product awareness, manufacturers continue unabated expending enormous sums of capital on in-store marketing realizing a significant portion of this capital is being unused, not deployed, and a clear waste of time and money.

SUMMARY

In various embodiments, methods and a system for monitoring and analysis platform processing are provided.

According to an embodiment, a method for monitoring and analysis platform processing is presented. Criteria is received that defines a project and resources are configured based on the criteria. Video is captured within a target area from at least one of the resources during a project period based on in the criteria. The video is analyzed for behaviors of objects within the target area, and intentions are derived for a first object type based on the behaviors. The intentions are stored in a data store associated with the project for reporting, query processing, and real-time notifications.

DETAILED DESCRIPTION

Figure 1:
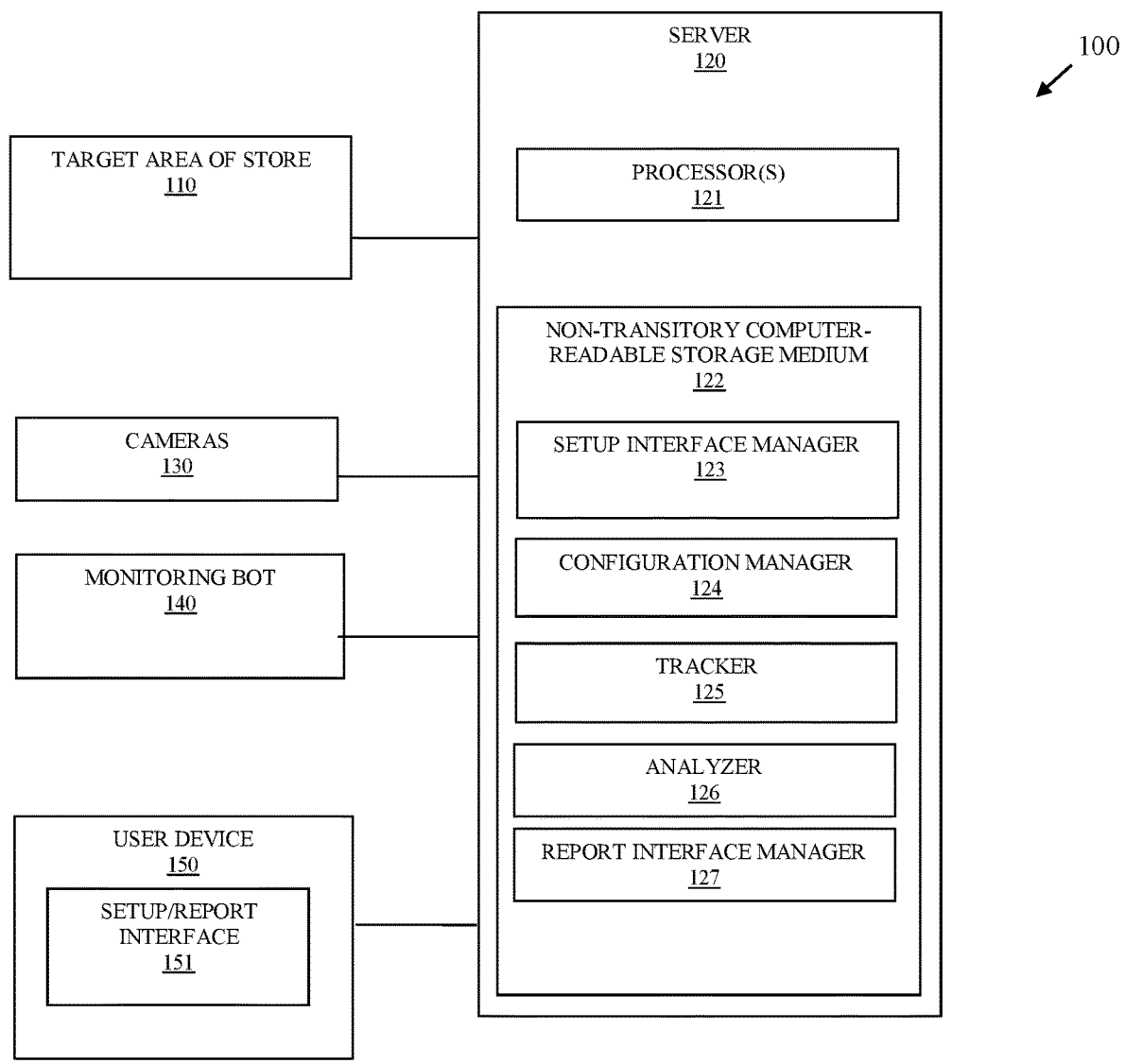
FIG. 1 is a diagram of a system for monitoring and analysis platform processing, according to an example embodiment.

FIG. 1 is a diagram of a system 100 for monitoring and analysis platform processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of monitoring and analysis platform processing, presented herein and below.

As used herein and below, the terms "user," "consumer," "user," and "customer" may be used interchangeably and synonymously. The terms refer to an individual that is a subject of at least a portion of the monitoring and analysis platform processing discussed herein and below.

System 100 includes a plurality of processing devices and device types 120-150. The system 100 includes a target area of a store 110, a server 120, cameras 130, optionally a monitoring bot 140, and user devices 150. Server 120 includes executable instructions that execute on one or more hardware processors 121 of server 120 from a non-transitory computer-readable storage medium 122 as: a setup interface manager 123, a configuration manager 124, a tracker 125, an analyzer 126, and a report interface manager 127.

It is to be noted that there may be multiple servers 120, such that the different elements 123-127 may execute on a same server 120 or multiple different servers 120 networked together. Furthermore, the server 120 may be a Local Area Network (LAN)-based server 120 or a Wide-Area Network (WAN)-based server 120.

In an embodiment, the server 120 is part of a cloud-processing environment that includes a plurality of servers logically cooperating of a network as a single accessible server 120.

User device 150 include processors and non-transitory computer-readable storage media having executable instructions that when executed by the processor provide a setup/report interface 151. The user device 150 can include a desktop computer, a server, a Point-Of-Sale (POS) terminal, a phone, a tablet, and/or a wearable processing device.

Monitoring bot 140 is an autonomous robot that includes audio and visual capture and recording devices (microphones and cameras). The bot 140 also include navigation sensors, wireless network transceivers, and a mechanism by which the bot 140 can physical travel and move about a store. The bot 140 includes software that can remotely control and configure the bot 140 for purposes of moving the bot from an initial area within a store to an area adjacent to the target area 110. The bot 140 can then be configured to have its camera's field of view and focus remotely adjusted to focus on different perspective views of locations within the target area 110. Furthermore, the bot 140 is capable of streaming captured audio and video to the server 120.

The cameras 130 can include temporarily placed cameras or permanently affixed cameras located within the store. Each camera 130 can have its field-of-view and focus remotely adjusted and capable of streaming captured video to the server 120. In some cases, the cameras 130 also include microphones, such that audio captured in the vicinity of the cameras 130 are also captured and streamed from the cameras 130 to the server 120. Some cameras 130 may include wired network connections to the server 120 while other cameras 130 may include wireless transceivers for wirelessly connecting to the server 120.

The target area of the store 110 is a location within a store that is designated for monitoring. The store 110 may include more than one target area 110 and the target area 110 can be changed.

The setup interface manager 123 interacts with the setup/report interface 151 to define parameters and configuration settings for a monitoring activity, such as a marketing activity or program. An originator of the monitoring activity operates the user device 150 using the setup/report interface 151 to interact with the setup interface manager 123 and define the monitoring activity. The parameters and configuration settings can includes a variety of information, such as and by way of example only: a name associated with the monitoring activity; the dates for performing the monitoring; any products associated with the monitoring; size and dimensions needed for the target area 110 where the monitoring will occur; size, dimensions, and description of any monitoring display of products within the target area or monitoring marketing materials; resources needed for the target area 110 (tables (size of tables), crates, shelves, specialized lights, digital signage, monitors, terminals, etc.); types of information desired for the monitoring activity (gender of consumers, general age of consumers, ethnicity of the consumers, time spent looking in the target area 110 by the consumer, etc.), etc.

The setup interface manager 123 assembles a listing of the resources and computers needed dimensions of the target area 110 for the monitoring activity. The dates needed for the monitoring activity and the resource list along with the necessary dimensions of the target area 110 are then provided by the interface manager 123 to the configuration manager 124.

The configuration manager 124 interacts with in-store back-end systems to determine the availability and location of any of the needed resources that are to be supplied by the store and are not being provided by the originator. These needed in store resources are reserved and scheduled for the dates defining the monitoring activity. The date that the monitoring activity is to begin, the configuration manager accesses cameras 130 to obtain images of the target area 110 and/or instructs the monitoring bot 140 to travel to target area 110 to capture images of the target area. Based on the original requirements for the target area 110 and the needed resources, the configuration manager 124 confirms that the target area 110 conforms to the initial provided descriptions provided with the configuration settings and parameters. A live video feed of the target area may also be made available on the start date and time of the target area 110 to the originator through the setup/report interface 151. This permits the originator to review the target area 110 visually and confirm that the defined resources and the arrangement of resources/products in the target area 110 are setup and deployed in the manner defined by the originator.

Unlike conventional approaches that rely on trust for setting up monitoring activities and monitoring displays, the current approach provides a real-time verification mechanism by which the originator can define and confirm that monitoring areas are deployed to the liking of the originator, through the setup manager 122, the setup report interface 151, and the configuration manager 124.

Once the monitoring activity is scheduled to start, the configuration manager 124 optionally instructs a monitoring bot 140 to travel to the target area 110 and/or obtains live video/audio feeds from designated cameras 130 that include field of views that cover the target area 110. The cameras 130 and/or the cameras of the bot 140 are adjusted remotely to ensure that the field of views for the corresponding cameras are properly focused in the target area 110 to capture facial expressions of consumers. Similarly, audio feeds are checked to ensure that audio can be heard from customers within the target area 110. Optimization filters may also be processed to filter out background noise from the audio feeds that are not associated with the target area 110 and to identify irrelevant background images that are not associated with the target area 110 from the live video feeds. The background images may also be used and identified as reference points for determining and identifying features of a customer when present within the target area 110.

The configuration manager 124 then activates the tracker 125 at the start of the monitoring activity and provides the audio and visual feeds from the appropriate cameras 130 and microphones (some of which or all of which may be associated with or originate from the bot 140). The tracker 125 maintains image tracking of products within the target area, promotional material, and people that enter and leave the target area along with audio of any people present within the target area.

The tracker 125 provides the filtered images and audio to the analyzer 126. The analyzer 126 may include one or more machine-learning algorithms designed to extract features from the video and the audio feeds associated with customers present within the target area 110. Some of these features can include, by way of example only: direction of stare of the customer (towards or away from the monitoring display and/or promotional materials); length of stare when made in the direct of the monitoring display, product, and/or promotional materials; length of time within the target area 110 by a customer; comments made favorable towards the product associated with the target area 110; comments made that were unfavorable towards the product, customers that took a product within the target area 110; customers that did not take a product; customers that made favorable or unfavorable facial expressions toward the target area 110 or product; perceived gender and age of customers within the target area 110; customers that returned back to the target area 110 more than 1 time and length of time between return visits; general dimensions or perceived size of the customers within the target area 110, interactions with the products by the customers within the target area 110 or interactions with any monitoring display or promotional materials, quantity of products taken by customers that take a product from the target area, and other features.

The monitoring metrics collected by the tracker 125 are streamed to the analyzer 126. The analyzer 126 then aggregates categories of metrics and indexes the metrics in a data store for custom-originator driven aggregations. The aggregations of the metrics and the raw metrics are also indexed in the data store to minimally include unique keys for the name of the monitoring activity, the name of the product associated with the monitoring activity, a store identifier for the store associated with the monitoring activity, an identifier for the target area, and an identifier for the originator.

In an embodiment, the raw video and audio is indexed and linked to each captured metric or set of metrics for a given metric. Links to the corresponding raw video and audio is available when accessing the data store.

In an embodiment, the analyzer 126 may also anonymize the raw video streams indexed to the aggregated metrics, such that the faces and actual voices of the real customers are not capable of being seen. In this way, the customer identities and their comments regarding their monitoring activity tracked in the target area 110 remain private and undiscernible from the raw video and audio data.

The report interface manager 127 provides a back-end interface to the data store having the aggregated metrics and the raw audio and video data. The report interface manager 127 also interacts with the setup/report interface 151 on the user device 150. The user/originator can then do custom queries and/or receive canned views of different levels (levels of detail) of custom aggregations or canned aggregations of the metrics for the monitoring activities tracked in the target area 110. This allows real time measurements for the monitoring activity occurring with in the store to determine where things can be improved, what worked, what did not work, and whether the retailer/store followed the instructions for the monitoring project.

In an embodiment, the monitoring project/activity is a marketing or promotion for a new product or an existing project of a manufacturer of the product.

In an embodiment, biometrics such as facial recognition is used to identify the customers when in the target area 110. Based on obtain approvals of the corresponding identified customers, the customer's registered identity and his/her specific activity within the target area 110 may be shared and used for reaching out to those customers for advice on the project activity and/or for taking a survey, etc.

There are several variations on how the system 100 can operate, some of which are discussed above and some of which are more completely discussed below with the other FIGS. 2-5.

Figure 2:
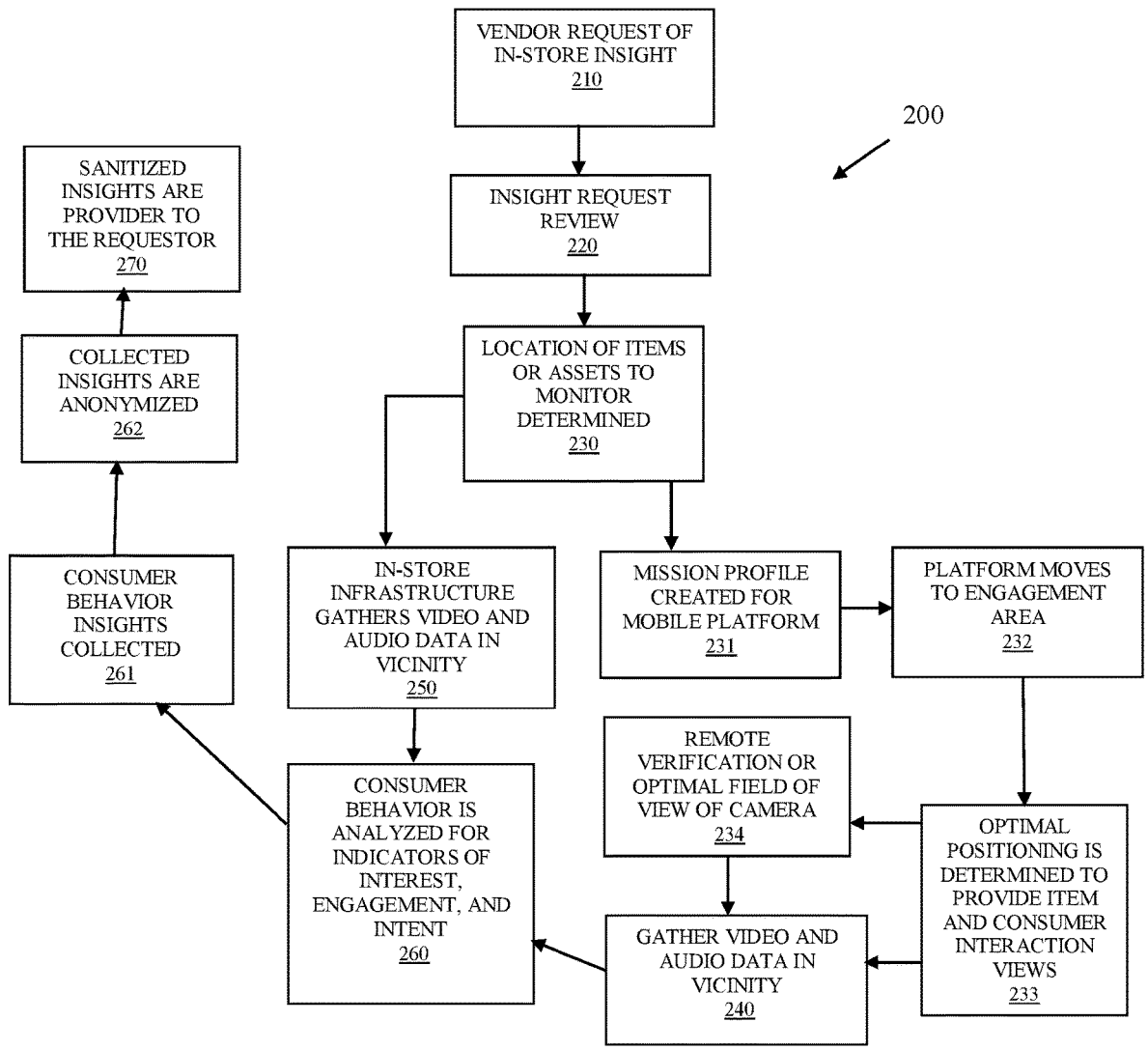
FIG. 2 is a diagram of processing associated with platform monitoring and analysis, according to an example embodiment.

FIG. 2 is a diagram of processing 200 associated with platform monitoring and analysis, according to an example embodiment.

At 210, the setup interface manager 123 interacts with an originator/user operating a user device 150 through the setup/report interface 151 for purposes of receive a request for in-store insight during a marketing project/promotion/campaign being implemented or released by the originator/manufacture of a given product or service. This entails receiving a variety of originator-defined parameters and resource (shelving, cameras 130, bot 140, digital signage, monitors/terminals, specialized lighting, display boards, tables, chairs, specialized equipment) requirements. The project is named and dimension or space requirements for a target area 110 within a store are identified. The originator may also define the types of metrics that are to be collected and the type of activities that are to be tracked for the monitoring project. Furthermore, the project or service is defined and the time period (calendar dates, days of week, and times of day) for the project is defined.

At 220, a review of the request is performed (this can be performed by either one of or both of: the setup interface manager 123 and/or the configuration manager 124). This can entail manual verification, partial manual verification, partial automated, or completely automated review. The review would identify wherein the target area 110 is available during the dates associated with the monitoring project being defined. A planogram of the target store that identifies the layout of the store and the locations or products along with the product locations on the shelves is obtained. The planogram is scanned for an area that conforms to the target area 110 needed for the request and a calendar of the store is checked to be sure that the space for the target area is available during the time period needed for the monitoring project.

At 230, the setup interface manager 123 and/or the configuration manager 124 identifies the current location of the items or assets (products) that are to be monitored. This can be done by using the planogram and/or interacting with an inventory system of the store. In some cases, the items may be new and in route through a distributor to the store and not yet available within store inventory.

At 231, the configuration manager 124 creates a mission profile for any robot 140 that is to be deployed for the monitor. This includes a location within the store for the bot 140 to travel to at a time prior to the scheduled launch of the project, the location is within or adjacent to the target area 110. The configuration manager 124 also provides instructions to the bot 140 to position its camera's lens to have a proper field of view and set its microphone to be directed to areas of the target area 110 that customers will be speaking to capture audio.

In an embodiment, the bot 140 and its audio and video feeds are moved to the target area and tested prior to the actual start time of day for the monitoring project.

Accordingly, at 232, the bot 140 (following instructions and a schedule provided by the configuration manager 123) autonomously moves from a staging or initial bot location to the target area 110.

At 233, the configuration manager 124 interacts with the bot 140 and remotely controls the bot 140 to determine optimal position with optimal audio and video feeds being captured and reported back from the bot 140.

In an embodiment, at 234, the configuration manager 124 may include a remote interface that permits manual visual and audio verification of the optimal field of view for the bot's camera and microphone. Changes can be manually made through the remote interface causing the configuration manager 124 to send commands to the bot 140 to adjust the camera field of view and/or focus of the microphone.

At the start time and start date, defined for the monitoring project, at 240, the bot 140 begins live streaming the audio and visual feeds to the tracker 125.

In an embodiment, at 250, existing in-store cameras 130 and microphones of the store having the target area 110 are used and controlled in a similar manner to what was defined at 233 and 234. The live audio and visual feeds are live streamed to the tracker 125 at the start time and start date defined for the monitoring project by the tracker 125 and/or the configuration manager 124.

The tracker 125 tracks and labels all objects being tracked (people, items, marketing materials, marketing assets being used (monitors, interactive displays), etc.) in the video feed and the audio feed. Each customer is given a unique identifier by the tracker 125 as are each of the other objects. Machine learning may be used to train a machine learning algorithm with pixels and/or audio snippets to assist in the training.

The analyzer 126 receives tagged video and audio and utilizes rules or machine learning to determine interactions between the customers and the objects, such as when eyes of the customer are focused on the product, the customer has picked up an object, the customer has made a facial expression with respect to an object, the customer has made a comment directed specifically to the object, etc. The rules for determining customer interaction or behaviors while in the target area of the store with respect to the other objects being tracked can be customized and evaluated in real time by the analyzer 126. Each behavior or interaction is tagged with a unique identifier and mapped to a corresponding set of video frames or audio snippet through a link or a reference number. The interactions and behaviors are then stored in a data store as discussed above with the discussion of the FIG. 1.

At 260, the tracker 125 and the analyzer 126 process live audio frames and video frames captured of the target area with the configured field of view for the corresponding cameras of either the in-store infrastructure cameras 130 or the bot 140. The result is tagged behaviors that provide indicators of interest, engagement, and intent of the customers while inside the target area 110 where the monitoring project is being monitored. This data of behaviors is then tagged linked to the audio and video feeds and stored in the data store.

At 261, the analyzer 126 continuous aggregates the behaviors at custom level of details, which may also be driven by customized rules. The aggregations are indexed and housed in the data store for purposes of providing real-time summaries, tallies, and insights into the success and/or failure of the monitoring project. The indexed data store may also include a link to a sales database for dynamically importing sales data for the product made by the store during the monitoring project. The indexed data store may also include links to online surveys or customer feedback provided with respect to the product and/or the monitoring project. Still further the indexed data store may include links to total returns of the product realized by the store during the monitoring project.

At 262, the analyzer 126 anonymizes the audio and video data that is linked to the tracked behaviors in the data store. This may include graying or otherwise obfuscating pixels revealing a face of any given customer from the linked video frames and using a voice altering algorithm to mask a pitch and tone of linked audio snippets.

At 270, the report interface manager 127 provides the setup/report interface 151 with access to the sanitized (anonymized) data store that is indexed and includes custom rule-based aggregation metrics for the monitoring project. Custom queries and reports may be generated on behalf of the user/originator. Moreover, the returned tallies and aggregations may be provided in the interface 151 with varying levels of detail (coarse grain or fine grain) and the user may interactive view more detail or less detail through the interface 151.

In an embodiment, the report interface manager 127 allows the interface 151 to define dynamic and real-time notifications that are pushed when certain threshold aggregation levels are reached or are not reached. The report interface manager 127 may at custom defined intervals perform custom queries against the data store to determine if threshold levels are reached and trigger automatically send of data records relevant to the threshold to defined individuals through text or email. The text and/or email may include a link that when activated by the user automatically launches the interface 151 within a context associated with what triggered the notification from the data store records.

In an embodiment, the interface 151 is a mobile application (app) customized to interact with the setup interface manager 123 and the report interface manager 127.

In an embodiment, the interface 151 is a browser and server hosted browser-based interface that is rendered as web browser pages when the user of user device 150 access a website or a link associated with the interface 151.

In an embodiment, a statistical profile is generated by the analyzer 126 to ensure that data captured, and metrics generated meets any stated requirements defined by the user when defining the monitoring project (this can be done through a mission statement that indicates minimal behaviors/interactions are to be captured and aggregated).

In an embodiment, the analyzer 126 performs aggregations and tallies in accordance with a statistical model for the monitoring project.

In an embodiment, the report interface manager 127 determines when a stated threshold for determining a successful monitoring project is reached and automatically generates a report with summarized aggregation behavior metrics and sends a link of the report to the originator and/or store manager. This is configurable within the report interface manager 127.

In an embodiment, negatively determined interactions are tracked and custom aggregated according to custom rules by the analyzer 126. In this way, both positive and negative behaviors/interactions are tracked and analyzed.

In an embodiment, the report interface manager 126 generates a variety of different graphics related to a single aggregated behavior and/or a custom set of aggregated behaviors from the data store. In an embodiment, a customized heat map is generated that includes variations of red with red being the customer directly looking at a product associated with the monitoring project and blue being the customer looking completely away from the product while the customer is within the target area 110. Variations between red and blue are where the customer was indirectly look or not looking at the product; and the length of time for a given customer for looking at and looking away is noted. The heat map itself can be aggregated on different levels such as per day, per week, per hour of a day, per day of a week, per month, per the entire length of the monitoring project. A click on a given location within the heat map may bring up more detail about the customer interactions, such as customer picked up the product and set it back down, customer picked up the product and placed in his/her cart, customer made a favorable or unfavorable remark. A further click on the interactions may provide the video and/or audio (anonymized to mask the customer's identity).

In an embodiment, the report interface manager 126 may have access to other data stores collected by other stores for the same monitoring project (based on a unique originator identifier, unique store identifiers, and unique monitoring project identifier). In this way, the report interface may search multiple data stores, each associated with an instance of the monitoring project at a specific store and provide reports and interactive graphics depicting aggregations of stores and/or comparisons between stores.

It is noted that the above is presented for purposes of illustration, since once the raw audio feed and video feed is tagged and processed by custom rules, any number of searches and reports can be generated and provided by the report interface manager 126 as can any customized reporting and notifications based on customized thresholds.

In an embodiment, the setup interface manager 123 permits the originator/mission creator to enter dollars spent for the monitoring project at the store. The dollars spent may be retained in the data store with the project identifier and the originator identifier. The report interface manager 127 may then provide with rendered reports or views metadata about the project, which may include dollars spend, sales revenue from sales during the monitoring project on a store level, and other metadata such as product identifiers associated with the product, dates of the project, store location, store name, store manager name and contact information, etc.

In an embodiment, the originator is a manufacture of an existing product or new product launch.

In an embodiment, the originator is a distributor of an existing product or a new product.

In an embodiment, the originator is the retail store manager and an in-store promotion.

In an embodiment, the server 120 is provided as a cloud-based service to stores, distributors of goods, and manufactures of goods.

One now appreciates how a monitoring project/mission can be custom defined for a given store. Assets, resources, and set up of a target area are configured and verified for the project. Audio and video of customers and those customer interactions within the target area are tracked in real time during the project period. Aggregations of behaviors and interactions of the customers are custom reported at different levels of detail. This allows manufacturers and/or distributors of products and services to: track, monitor, and verify mission criteria; measure mission goals against actual results; and determine what works and what does not work for purposes of any given mission. Heretofore, such was not achievable and was based solely on ad-hoc spot checks by the originators to the store and trust.

These and other embodiments are now discussed with reference to the FIGS. 3-4.

Figure 3:
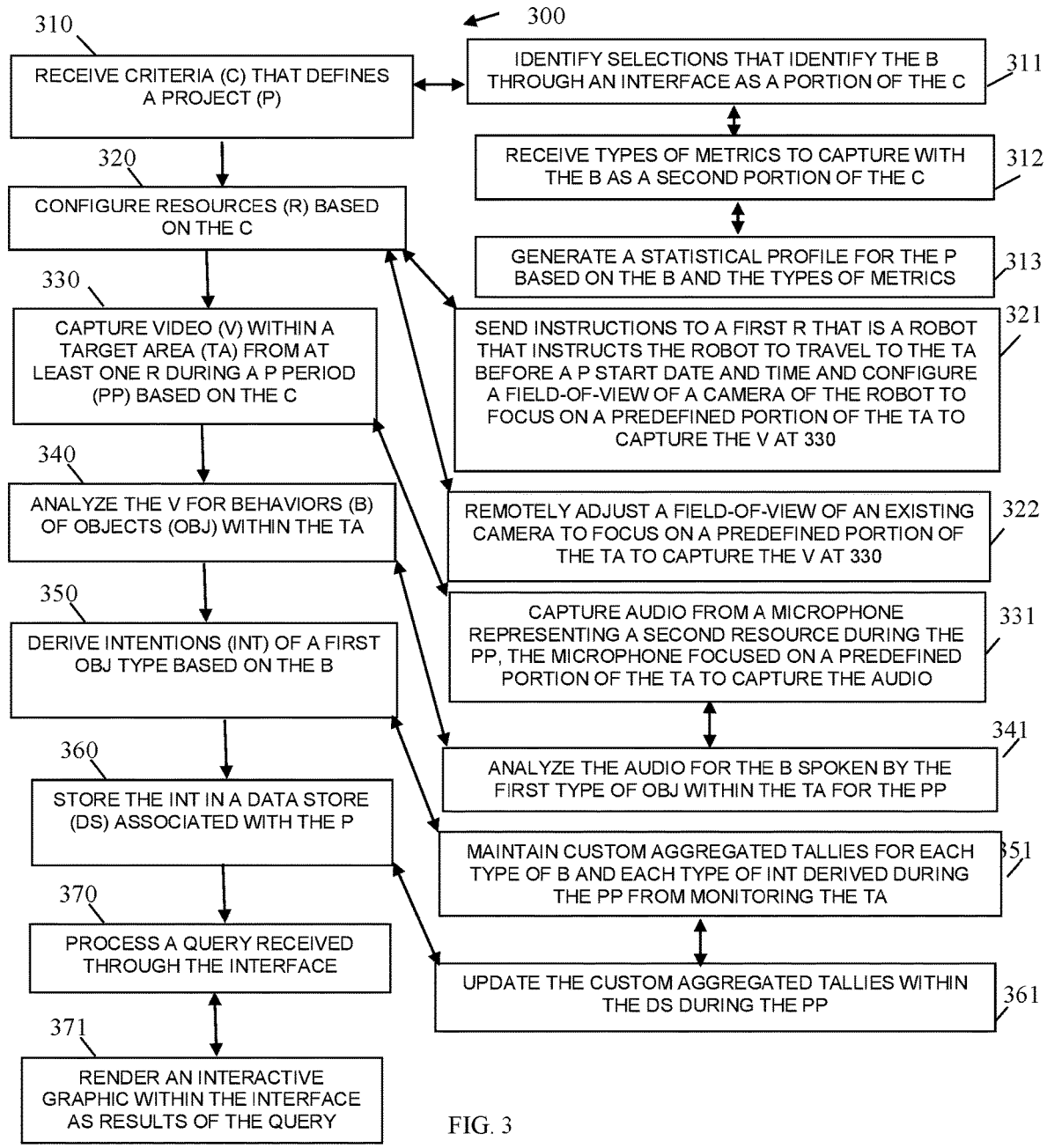
FIG. 3 is a diagram of a method for monitoring and analysis platform processing, according to an example embodiment.

FIG. 3 is a diagram of a method 300 for monitoring and analysis platform processing, according to an example embodiment. The software module(s) that implements the method 300 is referred to as a "monitoring project manager." The monitoring project manager is implemented as executable instructions programmed and residing within memory and/or a non-transitory computer-readable (processor-readable) storage medium and executed by one or more processors of a device. The processor(s) of the device that executes the monitoring project manager are specifically configured and programmed to process the monitoring project manager. The monitoring project manager may have access to one or more network connections during its processing. The network connections can be wired, wireless, or a combination of wired and wireless.

In an embodiment, the device that executes the monitoring project manager is the server 120. In an embodiment, the server 120 is a cloud-based processing environment comprising a collection of physical servers cooperating as a single logical server. In an embodiment, the server 120 is a Local-Area Network (LAN)-based server or a Wide-Area Network (WAN)-based server.

In an embodiment, the monitoring project manager is all or some combination of the setup interface manager 123, the configuration manager 124, the tracker 125, the analyzer 126, the report interface manager 127, and/or the processing 200 described in the FIG. 2 above.

At 310, the monitoring project manager receives criteria that defines a project. These criteria can include a variety of information, such as was discussed above with the FIGS. 1 and 2; for example, desired metrics for the project (desired tabulations for specific behaviors or specific intentions or combinations of behaviors and/or intentions with or without a predefined sequence for those behaviors and/or intentions); project start and stop times (dates, day of week, etc.); project name/unique identifier; product identifiers associated with the project; size (dimensions) needed for a target area where the project is to be monitored; any specialized resources needed within the target area; conditions for generating automated reports or notifications; and any other parameters and configuration information discussed above.

In an embodiment, at 311, the monitoring project manager identifies selections that identify the behaviors that are to be monitored and tracked through an interface, such as interface 151 as a portion of the criteria.

In an embodiment of 311 and at 312, the monitoring project manager receives types of metrics to capture with the behaviors as a second portion of the criteria through the interface 151. The types of behaviors can be selected from a list of tracked behaviors, such as staring at a product within the target area, touching the product, holding the product, placing the product in a cart, walking away with the product, subsequently returning the product back to the target area after having initially left with the product, favorable words spoken about the product, unfavorable words spoken about the product, custom combinations of different selected behaviors occurring with a same customer in a predefined order or in an undefined order, length of time the customer stays within the target area, length of time of a stare or focus by the customer on the product, and others.

In an embodiment of 312 and at 313, the monitoring project manager generates a statistical profile for the project based on the behaviors and the types of metrics. The profile can also define a successful project or an unsuccessful one if predefined thresholds are met from the metrics during the project period.

At 320, the monitoring project manager configures resources based on the criteria. The resources may be specialized or native to the store associated with the target area from which the project is to be monitored.

In an embodiment, at 321, the monitoring project manager sends instructions to a first resource that is an autonomous robot 140. The instructions instruct the robot 140 to travel to the target area before a project start date and time and configure a field-of-view of a camera of the robot 140 to focus on a predefined portion of the target area to capture video and/or audio (using a microphone of the robot 140). The video and/or audio is streamed by the robot 140 to the monitoring project manager at 330 when the project start time arrives.

In an embodiment, at 322, the monitoring project manager remotely adjusts a field-of-view of an existing camera 140 to focus on a predefined portion of the target area to capture the video when the project is initiated at 330.

At 330, the video within the target area from at least one camera resource is captured during a project period based on the criteria that defined the project at 310.

In an embodiment, at 331, the monitoring project manager captures audio from a microphone representing a second resource during the project period. The microphone configured back at 320 to focus on a predefined portion of the target area to capture audio of customers presenting within the target area.

At 340, the monitoring project manager analyzes the video for behaviors of objects identified from the video frames within the target area. The behaviors are predefined and can be custom defined based on aggregations without or without sequencing by the user through interface 151 within the criteria received at 310. Behaviors can include touching, looking, holding, removing, returning, commenting, etc. by the customer about a target object, such as a product associated with the project monitoring.

In an embodiment of 331 and 340, at 341, the monitoring project manager analyzes the audio for the behaviors that are spoken by the first type of object (discussed at 350 below and refers to customers within the target area) within the target area for the project period.

At 350, the monitoring project manager derives intentions of the first object type based on the behaviors. The first object type is customers (people) detected in the target area.

Intentions can be predefined as a degree of interest in the project and can be rule-based based on the number of behaviors, length of time associated with the behaviors, taking the product for purchase, remarking favorable or unfavorably about a target product/object, etc. Moreover, determinations of intentions can be based on machine learning that is trained based on historical analysis of customers with respect to their behaviors and a result known to have occurred with those customers, such as purchase or non-purchase of the product. The machine learning can be ongoing during the project period to improve the machine-learning accuracy.

In an embodiment, at 351, the monitoring project manager maintains customer aggregated tallies for each type of behavior and each type of intention during the project period from monitoring the target area.

At 360, the monitoring project manager stores the intentions in a data store associated with the project. That is, an association between the intentions, the behaviors, and the audio are indexed and stored in a database.

In an embodiment of 351 and 360, at 361, the monitoring project manager updates the custom aggregated tallies as they change within the data store during the project period.

In an embodiment, at 370, the monitoring project manager processes a query received through an interface, such as interface 151. The query can include custom defined tallies based on time, date, time of day, and different behaviors, intentions, etc., and is limited only by the raw data stored in the data store.

In an embodiment of 370 and at 371, the monitoring project manager renders an interactive graphic within the interface 151 as results of the query. The user can click on portions of the interactive graphic to get more detail or less detail and drill down into the metrics and or view the video and audio that corresponds to particular metrics. In an embodiment, the video and audio is anonymized to mask the identity of the customers (face and voice) as was discussed above with the FIGS. 1 and 2.

Figure 4:
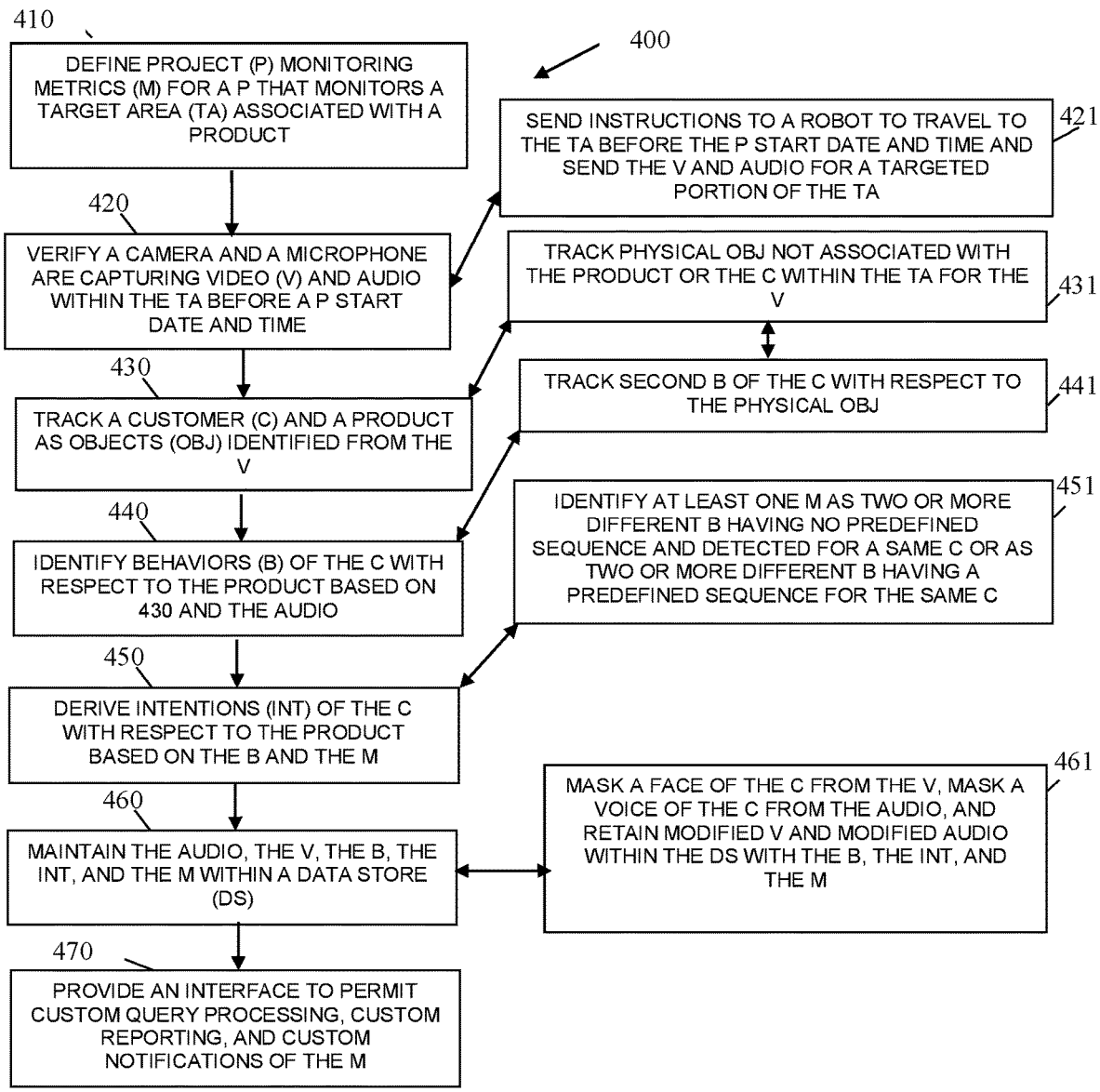
FIG. 4 is a diagram of another method for monitoring and analysis platform processing, according to an example embodiment.

FIG. 4 is a diagram of another method 400 for monitoring and analysis platform processing, according to an example embodiment. The software module(s) that implements the method 400 is referred to as a "project tacker and analyzer." The project tacker and analyzer is implemented as executable instructions programmed and residing within memory and/or a non-transitory computer-readable (processor-readable) storage medium and executed by one or more processors of a device. The processors that execute the project tacker and analyzer are specifically configured and programmed to process the project tacker and analyzer. The project tacker and analyzer may have access to one or more network connections during its processing. The network connections can be wired, wireless, or a combination of wired and wireless.

In an embodiment, the device that execute the project tacker and analyzer is the server 120. In an embodiment, the server 120 is a cloud processing environment, a LAN server, or a WAN server.

In an embodiment, the project tacker and analyzer is all of, or some combination of: the setup interface manager 123, the configuration manager 124, the tracker 125, the analyzer 126, the report interface manager 127, the processing 200, and/or the method 300.

The project tacker and analyzer presents another and, in some ways, enhanced processing perspective of the method 300.

At 410, the project tacker and analyzer defines project monitoring metrics for a project that monitors a target area associated with a product. The project can be for a promotion of an existing product or a promotion for a new product launch.

At 420, the project tacker and analyzer verifies a camera and a microphone are capturing video and audio within the target area before a project start date and time.

In an embodiment, at 421, the project tacker and analyzer sends instructions to an autonomous robot 140 to travel to the target area before the project start date and time and send video and audio for a targeted portion of the targeted area.

At 430, the project tacker and analyzer tracks a customer and a product as objects identified from the video. This can be achieved using image processing, machine learning, and any of the above-mentioned techniques.

In an embodiment, at 431, the project tacker and analyzer tracks physical objects that are not associated with the product or the customer within the target area from the video. This can include marketing material, information packets on the product, interaction with a digital sign associated with providing information about the product, an interactive game or survey associated with the product, etc.

At 440, the project tacker and analyzer identifies behaviors of the customer with respect to the product based on 430 and speech analysis of the audio (for predefined words, phrases, etc. made by the customer with respect to the product within the target area).

In an embodiment of 431 and 440, at 441, the project tacker and analyzer tracks second behaviors of the customer with respect to the physical objects that are not the customer or the product. This can be from the video and the audio and may provide information at to the effectiveness of those physical objects for the project.

At 450, the project tacker and analyzer derives intentions of the customer with respect to the product based on the behaviors and the project monitoring metrics.

In an embodiment, at 451, the project tacker and analyzer identifies at least one project monitoring metric as two or more different behaviors having no predefined or required sequence for a same customer within the target area or as two or more different behaviors having a predefined sequence for the same customer.

At 460, the project tacker and analyzer maintains the audio, the video, the behaviors, the intentions, and the project monitoring metrics within a data store along with their associations to the project within the target area for each separate customer.

In an embodiment, at 461, the project tacker and analyzer masks a face of the customer from the video, masks a voice of the customer from the audio, and retains modified video and modified audio within the data store with the behaviors, the intentions, and the project monitoring metrics. This preserves the anonymity of each customer.

At 470, the project tacker and analyzer provides an interface (such as interface 151) to permit and for processing against the data store: customer queries, custom reporting, and custom notifications of the project monitoring metrics.

Figure 5:
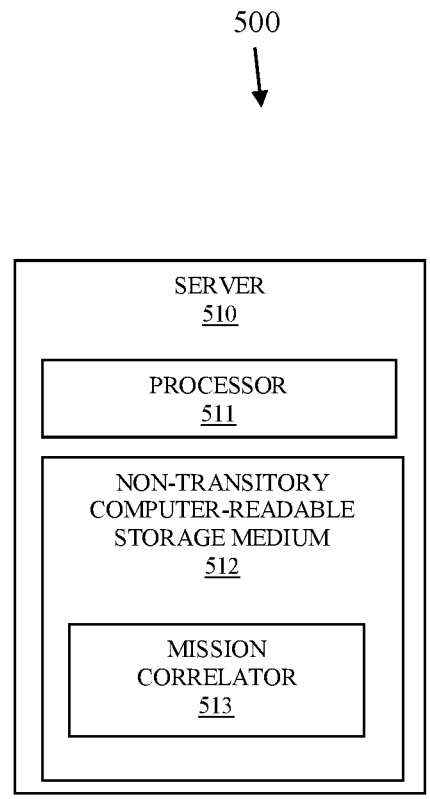
FIG. 5 is a diagram of another system for monitoring and analysis platform processing, according to an example embodiment.

FIG. 5 is a diagram of a system 500 for monitoring and analysis platform processing, according to an example embodiment. The system 500 includes a variety of hardware components and software components. The software components of the system 500 are programmed and reside within memory and/or a non-transitory computer-readable medium and execute on one or more processors of the system 500. The system 500 communicates over one or more networks, which can be wired, wireless, or a combination of wired and wireless.

In an embodiment, the system 500 implements, inter alia, the processing described above with the FIGS. 1-4.

The system 500 includes: a server 510 having a processor 511 and non-transitory computer-readable storage media 502 having executable instructions representing a mission correlator 513.

In an embodiment, server 510 is server 120. In an embodiment, server 120 is a cloud-based server, a LAN-based server, or a WAN-based server.

In an embodiment, the mission correlator 513 is all or some combination of: the setup interface manager 123, the configuration manager 124, the tracker 125, the analyzer 126, the report interface manager 127, the processing 200, the method 300, and/or the method 400.

The mission correlator 513 when executed by the processor 511 from the non-transitory computer-readable storage medium 513 causes the processor 511 to: 1) obtain mission metrics and a location identifying a target area 110; 2) configure audio/visual resources to provide audio and video streams from the target area 110 during a mission monitoring period; 3) track behaviors of a customer with respect to an object present within the target area 110 from the audio and video; 4) derive intentions of the customer with respect to the object based on the behaviors and the mission metrics; 5) index and correlate the audio, the video, the behaviors, the intentions, and the mission metrics within a data store; and 6) provide an interface to query, report, and notify from the data store based on custom criteria defined through the interface.

In an embodiment, the mission correlator 513 when executed by the processor 511 from the non-transitory computer-readable storage medium 512 is further configured to cause the processor 511 to: 6) map the mission metrics to a statistical model; 7) generate a report reflecting a custom summary of the mission metrics that conform to the statistical model at a mission end time; and 8) automatically send a link to the report to a predesignated email address or a predesignated mobile device as a text message.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
via a processor of a device performing:
receiving criteria that defines a project;
obtaining a size and dimensions of a target area for the project;
assembling a list of physical objects within the target area;
configuring resources based on the criteria, the size of the target area, the dimensions of the target, and physical object sizes for each of the physical objects in the list, wherein configuring further includes:
sending instructions to a first resource that is an autonomous robot that instructs the autonomous robot to travel to the target area before a project start date and time and configure a field-of-view for a camera of the autonomous robot to focus on a predefined portion of the target area to capture vide and configure audio feeds of the target area; and
processing filters that filters out background noise from the audio feeds and that identifies irrelevant background images that are not associated with the target area from the video captured by the camera of the autonomous robot;
capturing the video within the target area from at least one of the resources during a project period based on in the criteria;
analyzing the video for behaviors of objects within the target area;
deriving intentions of a first object type based on the behaviors; and
storing the intentions in a data store associated with the project.

2. The method of claim 1 further comprising, processing a query received through an interface against the data store.

3. The method of claim 2, wherein processing further includes rendering an interactive graphic within the interface depicting results from processing the query against the data store.

4. The method of claim 1, wherein receiving further includes identifying selections that identify the behaviors through an interface as a portion of the criteria.

5. The method of claim 4, wherein identifying further includes receiving types of metrics to capture with the behaviors as second portion of the criteria.

6. The method of claim 5, wherein receiving the types of metrics further includes generating a statistical profile for the project based on the behaviors and the types of metrics.

7. The method of claim 1, wherein configuring further includes remotely adjusting a second field-of-view of an existing camera to focus on a predefined portion of the target area to capture portions of the video.

8. The method of claim 1, wherein capturing further includes capturing at least one of the audio feeds from a microphone representing a second resource during the project period, wherein the microphone focused on a predefined portion of the target area to capture the at least one of the audio feeds.

9. The method of claim 8, wherein analyzing further includes analyzing the at least one of the audio feeds for the behaviors spoken by the first object type within the target area during the project period.

10. The method of claim 1, wherein deriving further includes maintaining custom aggregated tallies for each type of behavior and each type of intention derived during the project period from monitoring the target area.

11. The method of claim 1, wherein storing further includes updating the custom aggregated tallies within the data store during the project period.

12. A method, comprising:
via a processor of a device performing:
defining project monitoring metrics for a project that monitors a target area associated with a product;
configuring a camera and a microphone for capturing video and audio within the target area before a project start date and time based on criteria defining the project, a size of the target area, dimensions of the target area, and physical object sizes of physical objects in the target area that are obtain from a list of the physical objects; wherein configuring further includes:
sending instructions to an autonomous robot to travel to the target area before the project start date and time and send the video and the audio for a targeted portion of the target area; and
processing filters that filters out background noise from the audio and that identifies irrelevant background images that are not associated with the target area from the video captured by the camera of the autonomous robot;
tracking a customer and the product as objects identified from the video;
identifying behaviors of the customer with respect to the product based on the tracking and the audio;
deriving intentions of the customer with respect to the product based on the behaviors and the project monitoring metrics;
maintaining the audio, the video, the behaviors, the intentions, and the project monitoring metrics within a data store; and
providing an interface to permit custom query processing, custom reporting, and custom notifications of the project monitoring metrics.

13. The method of claim 12, wherein tracking further includes tracking the physical objects not associated with the product or the customer within the targeted area from the video.

14. The method of claim 13, wherein identifying further includes tracking second behaviors of the customer with respect to the physical objects.

15. The method of claim 12, wherein deriving further includes identifying at least one of the project monitoring metrics as two or more different behaviors having no predefined sequence and detected for a same customer or as two or more different behaviors having a predefined sequence for the same customer.

16. The method of claim 12, wherein maintaining further includes masking a face of the customer from the video, masking a voice of the customer from the audio, and retaining modified video and modified audio within the data store with the behaviors, the intentions, and the project monitoring metrics.

17. A system, comprising:
a server comprising a processor and a non-transitory computer-readable storage medium having executable instructions representing a mission correlator;
the mission correlator when executed by the processor from the non-transitory computer-readable storage medium is configured to cause the processor to:
obtain mission metrics and a location identifying a target area;
configure audio/visual resources to provide audio and video streams from the target area during a mission monitoring period based on a size of the target area and dimensions of the target area and based on physical object sizes of physical objects within the target area obtained from a list of physical objects, wherein configuring the audio/visual resources further includes:
send instructions to an autonomous robot to travel to the target area before the project start date and time and send audio and video a targeted portion of the target area; and
process filters that filters out background noise from the audio and that identifies irrelevant background images that are not associated with the target portion from the video captured by a camera of the autonomous robot;
track behaviors of a customer with respect to an object present within the target area from the audio and the video;
derive intentions of the customer with respect to the object based on the behaviors and the mission metrics;
index and correlate the audio, the video, the behaviors, the intentions, and the mission metrics within a data store; and
provide an interface to query, report, and notify from the data store based on custom criteria defined through the interface.

18. The system of claim 17, the mission correlator when executed by the processor from the non-transitory computer-readable storage medium is further configured to cause the processor to:
map the mission metrics to a statistical model;
generate a report reflecting a custom summary of the mission metrics that conform to the statistical model at a mission end time; and
automatically send a link to the report to a predesignated email address or a predesignated mobile device as a text message.

* * * * *